(No Model.)
W. W. MICHAUX.
HARROW.
No. 526,933. Patented Oct. 2, 1894.
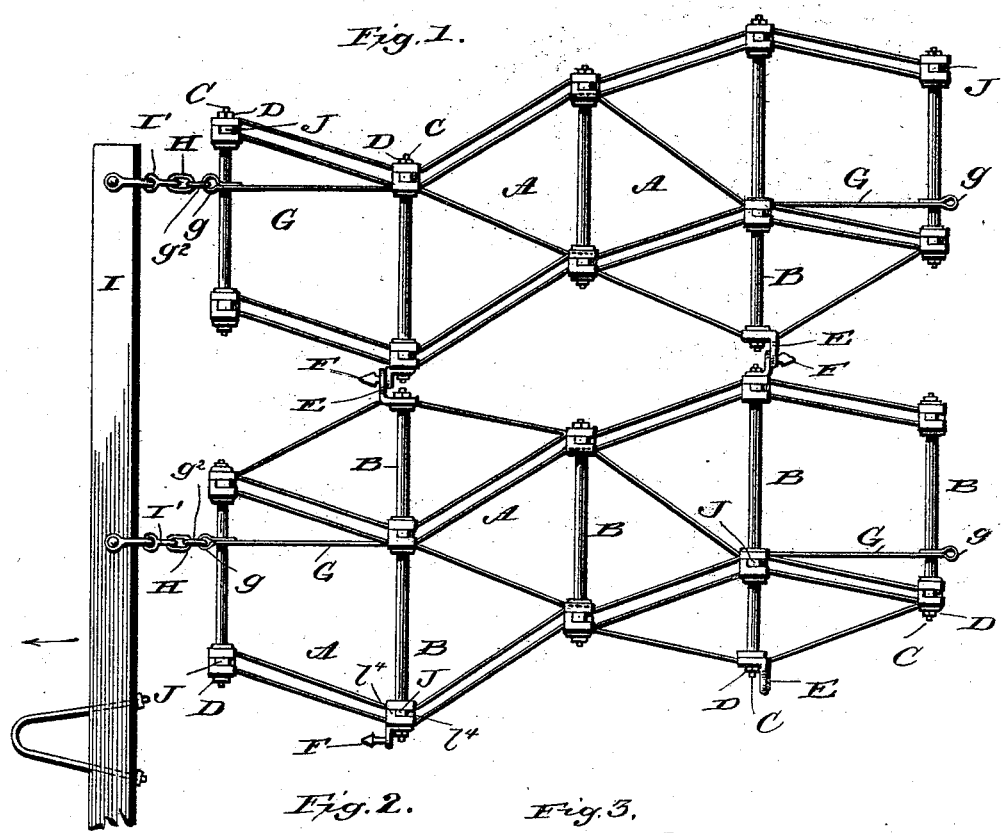
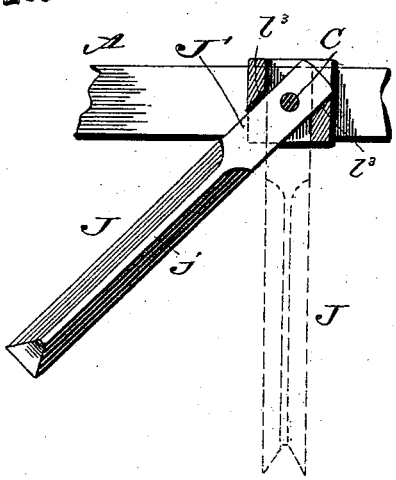
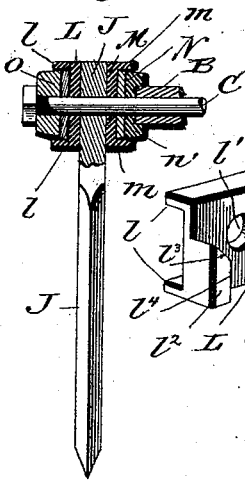
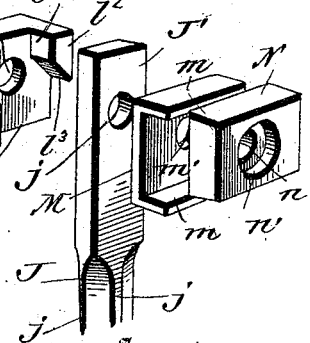
Witnesses
L. C. Hills
E. H. Bond
Inventor:
William W. Michaux,
By E. B. Stocking
Attorney

UNITED STATES PATENT OFFICE.

WILLIAM W. MICHAUX, OF MICHAUX, VIRGINIA.

HARROW.

SPECIFICATION forming part of Letters Patent No. 526,933, dated October 2, 1894.

Application filed December 5, 1893. Serial No. 492,850. (No model.)

*To all whom it may concern:*

Be it known that I, WILLIAM W. MICHAUX, a citizen of the United States, residing at Michaux, in the county of Powhatan, State of Virginia, have invented certain new and useful Improvements in Harrows, of which the following is a specification, reference being had therein to the accompanying drawings.

This invention relates to certain new and useful improvements in harrows of that class in which the harrow teeth are so mounted in the frame or in their bearings as to have a restricted movement, with means for holding the teeth in either their vertical or inclined position. The frame is made in sections detachably connected together in such a manner as to prevent accidental separation.

One of the main objects of the invention is to provide an improved socket or holder for the tooth, which holder at the same time serves to keep in place one end of the spacing rod or bar of the harrow frame. The main portion of the socket is formed with oppositely-inclined faces and opposing faces parallel with each other and against which the opposite faces of the shank of the tooth impinge when in its vertical position. When in its inclined position the opposite faces of the shank find bearings on the inclined faces of the socket. The frame is formed of band metal on edge and extending in a zig-zag direction from front to rear with the strips in pairs and braced by gas pipe and bolts therein with nuts so arranged that no projecting portions are left on top, so that in moving the harrow it may be turned over and made to slide easily without injury to the ground over which it is drawn or without injury to the harrow. A brace bar extends from each end of each section of the harrow frame in a zigzag direction to the center tube or bolt and is formed to receive the draft connection at each end, and the sections are connected together in such a manner as to each have a limited independent movement, which, in working upon hilly or uneven ground, is very desirable.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is top plan of a portion of a harrow constructed in accordance with my invention. Fig. 2 is a detail partly in side elevation and partly in vertical section, showing a tooth in its socket. Fig. 3 is a section at right angles to that of Fig. 2, with a portion of the shank of the tooth broken away. Fig. 4 shows in perspective, enlarged, the various parts of the holder, and the upper portion of a tooth, with the parts all in their relative positions.

Like letters of reference indicate like parts throughout the several views in which they appear.

Referring now to the details of the drawings by letter, A designates one of the sections of the harrow, and as each section is like its next adjacent one in all essentials a description of one will suffice for all. The frame of the harrow is formed of sheet or bar metal set on edge as shown, the pieces being bent to form substantially diamond shaped portions as seen in Fig. 1, and the bars or strips or pieces constituting the frame are secured together at their ends and at required points between their ends by means extending horizontally instead of vertically so as to avoid projections upon the upper face of the harrow. The means preferably employed are sections of gas pipe or tubes B of the required lengths and through these pass the bolts C which are provided at their ends with the nuts D as shown in Figs. 1 and 3.

E are castings with eyes or openings for the reception of the arms or arrow-head like parts F as shown in Fig. 1 and by which means the sections are pivotally connected together so that each may have a certain amount of vertical movement independent of the other. The castings are secured to the frame by the same bolts that hold the bars of the frame in position, as seen in Fig. 1.

G are strips set on edge similar to the strips or bars of the frame, and each extending in a zig-zag direction from opposite ends of the frame where they are held to the front and rear cross bars or bolts of the frame, and their other ends sleeved upon and held to the center bolt or tube of the frame at opposite ends thereof as indicated in Fig. 1. The outer end of each of these strips is bent upon itself to form a loop or hook $g$ as seen best in Fig. 1. These strips serve to aid in holding the sections of the harrow frame in place and further brace the same in a greater or less degree. They serve also as means for the attachment of the draft appliances as seen in Fig. 1, in which I is the draft bar to which are connected the hook I' attached to the draft bar by clevis or other suitable device and in turn engaged with the horizontal ring or link H which is engaged in the link $g^2$ which is held in the loop or eye $g$ of the strip G as seen in Fig. 1.

The strips or bars of the frame are arranged in pairs in parallel relation as seen in Fig. 1 and held at a regulated distance apart in any suitable way, as by the holders in which the teeth are held.

The harrow may be drawn in either direction by simply disengaging the hooks from one set of eyes $g$ and engaging the same over or into the eyes at the other end. When drawn in one direction it forms a straight tooth harrow and when drawn in the other direction we have what is termed a slanting tooth harrow, or a smoothing harrow with the teeth standing in the position in which they are shown by full lines in Fig. 2. It may be drawn bottom side up in going to or from the field and by reason of the peculiar construction of the frame there are no projections to injure the ground over which it is drawn or the harrow by catching in the ground.

J are the teeth which may be of any desired shape but preferably of the shape shown, that is, substantially diamond shaped with its four sides flattened as seen at $j$ in Figs. 2 and 4, and with the diameter thereof in one direction substantially twice that in the direction at right angles thereto. The tooth has a shank J' which is rectangular in form and is provided with an opening or hole $j'$ through which passes the rod or bar C upon which it is pivoted in the frame. These teeth are pivotally held in the frame and are designed to assume either an inclined position as shown by full lines in Fig. 2 or that shown by dotted lines in Fig. 2 and full lines in Figs. 3 and 4. The teeth are mounted for a predetermined amount of movement in the following manner: L is a casting or plate having upon one side the flanges $l$ between which the strips of the frame are held, as opening $l'$ through which the bolt or rod C passes as seen best in Fig. 3, and upon the face opposite that on which the flanges $l$ are formed with the flanges or lugs $l^2$ extending at right angles to the flanges $l$ and each extending for a portion only of the distance across the face of the casting and each terminating in a tapered or beveled face $l^3$ as seen best in Fig. 4, the tapers or bevels of the two lugs being oppositely disposed as is also shown in said Fig. 4. The vertical faces $l^4$ of these lugs are parallel with each other for a purpose which will soon appear.

M is a casting or plate with lugs or flanges $m$ as seen in Figs. 3 and 4 and with a hole $m'$ for the passage of the bolt or rod C, and N is a block adapted to fit between the flanges $m$ and it in turn is provided with a hole $n$ for the passage of the rod or bolt C and with a socket $n'$ as seen in Figs. 3 and 4 for the reception and retention of the end of a piece of the tube or gas pipe B as shown in Fig. 3. If desired a block O may be employed upon the opposite side of the casting or plate L and held between the flanges thereof outside the strip of the frame, as is shown in Fig 3.

In operation the teeth hang loosely on their pivots and will be kept in either a vertical or inclined position, according to from which end the harrow is drawn, by their contact with the soil, and when in an inclined position as shown by full lines in Fig. 2 the opposite faces of the shank of the tooth bear upon the opposite inclined faces $l^3$ of the casting L as shown, but when the teeth are in their vertical position the said opposite faces of the shank find bearings against the vertical faces $l^4$ of said casting as shown by dotted lines in Fig. 2. At the outside of the frame the strips or bars thereof are preferably doubled or in pairs as seen in Fig. 1 and as above described to give greater strength thereto, but they may sometimes be single.

Modifications in detail may be resorted to without departing from the spirit of the invention or sacrificing any of its advantages.

What is claimed as new is—

1. The combination in a harrow with strips arranged on edge and zig-zag, of strips also set on edge and independent of the strips of the frame and extending from the front and rear cross bolts of the frame in the line of draft to the next transverse bolts and thence oppositely in an inclined direction and connected with opposite ends of the central transverse bolts of the frame, substantially as specified.

2. The combination in a harrow with strips arranged on edge and zig-zag, of strips also set on edge and independent of the strips of the frame and extending from the front and rear cross bolts of the frame in the line of draft to the next transverse bolts and thence oppositely in an inclined direction and connected with opposite ends of the central transverse bolts with the front and rear ends of said strips bent upon themselves to form vertical eyes for the attachment of the draft appliances, substantially as specified.

3. The combination in a harrow frame of strips on edge, and spacing tubes and horizontally-disposed bolts with nuts, of a casting with flanges and lugs with oppositely-disposed faces, a plate with flanges, a tooth with a rectangular shank, and a block with a socket to receive one end of a tube, all held by the said bolt, substantially as specified.

In testimony whereof I affix my signature in presence of two witnesses.

WILLIAM W. MICHAUX.

Witnesses:
W. M. TILMAN,
CHAS. S. TAYLOR.